United States Patent
Suto et al.

(10) Patent No.: US 8,621,415 B2
(45) Date of Patent: Dec. 31, 2013

(54) OBTAINING POWER DOMAIN BY CLUSTERING LOGICAL BLOCKS BASED ON ACTIVATION TIMINGS

(75) Inventors: Kenta Suto, Kanagawa (JP); Satoshi Shibatani, Kanagawa (JP); Ryoji Ishikawa, Kanagawa (JP); Ken Saito, Kanagawa (JP); Yoshio Inoue, Kanagawa (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 0 days.

(21) Appl. No.: 13/372,434

(22) Filed: Feb. 13, 2012

(65) Prior Publication Data

US 2012/0216166 A1    Aug. 23, 2012

(30) Foreign Application Priority Data

Feb. 18, 2011    (JP) ................. 2011-032775

(51) Int. Cl.
*G06F 17/50*    (2006.01)

(52) U.S. Cl.
USPC ........... 716/132; 716/127; 716/133; 716/134; 716/135

(58) Field of Classification Search
USPC .......................... 716/127, 132–135
See application file for complete search history.

(56) References Cited

U.S. PATENT DOCUMENTS

| | | | |
|---|---|---|---|
| 5,867,415 A * | 2/1999 | Makino .................. 708/629 |
| 5,991,308 A * | 11/1999 | Fuhrmann et al. ....... 370/395.53 |
| 6,360,191 B1 * | 3/2002 | Koza et al. ............... 703/6 |
| 6,779,163 B2 * | 8/2004 | Bednar et al. ............ 716/113 |
| 6,971,074 B2 * | 11/2005 | Hasegawa et al. ......... 716/120 |
| 7,000,214 B2 * | 2/2006 | Iadanza et al. ............ 716/104 |
| 7,051,306 B2 * | 5/2006 | Hoberman et al. ......... 716/127 |
| 7,263,673 B1 * | 8/2007 | McElvain et al. ......... 716/103 |
| 7,296,251 B2 * | 11/2007 | Dhanwada et al. ........ 716/113 |
| 7,349,835 B2 * | 3/2008 | Kapoor et al. ............ 703/18 |
| 7,411,436 B2 * | 8/2008 | Fang et al. ............... 327/262 |
| 7,549,139 B1 * | 6/2009 | Tuan et al. ............... 716/108 |
| 7,551,985 B1 * | 6/2009 | Chen et al. ............... 700/297 |
| 7,596,769 B2 * | 9/2009 | Chen ....................... 716/109 |
| 7,613,942 B2 * | 11/2009 | Fallah et al. ............. 713/323 |
| 7,669,165 B2 * | 2/2010 | Pandey et al. ............ 716/109 |
| 7,714,610 B2 * | 5/2010 | He .......................... 326/41 |
| 7,739,629 B2 * | 6/2010 | Wang et al. ............... 716/136 |
| 7,760,011 B2 * | 7/2010 | Wang et al. ............... 327/544 |
| 7,920,020 B2 * | 4/2011 | Wang et al. ............... 327/544 |
| 7,944,754 B2 * | 5/2011 | Cernea .................. 365/185.21 |
| 7,958,466 B1 * | 6/2011 | Fung ....................... 716/100 |
| 8,056,033 B2 * | 11/2011 | Nakashima ............... 716/108 |
| 8,095,899 B1 * | 1/2012 | Dupenloup ............... 716/103 |
| 8,122,416 B2 * | 2/2012 | Saito et al. ............... 716/122 |

(Continued)

FOREIGN PATENT DOCUMENTS

JP    2008-176486 A    7/2008

*Primary Examiner* — Naum Levin
(74) *Attorney, Agent, or Firm* — Miles & Stockbridge P.C.

(57) ABSTRACT

A power domain is automatically generated.

A computer performs a function simulation process 9 for evaluating whether or not a designed circuit satisfies a specification, and a clustering process 10 which obtains a power domain by clustering logical blocks in which activation timings are within a range, based on the result of the function simulation process. Since the power domain is obtained by a process performed by the computer, the power domain can be optimized compared to a case when it is obtained by hand (manual work of the designer).

7 Claims, 11 Drawing Sheets

(56) References Cited

U.S. PATENT DOCUMENTS

| | | | |
|---|---|---|---|
| 8,239,700 B2* | 8/2012 | Nation et al. | 713/324 |
| 8,321,824 B2* | 11/2012 | Zejda et al. | 716/108 |
| 2004/0220993 A1* | 11/2004 | Mathew et al. | 708/670 |
| 2008/0040091 A1* | 2/2008 | Kim et al. | 703/18 |
| 2008/0313580 A1* | 12/2008 | Anand et al. | 716/3 |
| 2009/0259978 A1* | 10/2009 | Saito et al. | 716/5 |
| 2011/0061032 A1* | 3/2011 | Kojima | 716/104 |
| 2012/0054511 A1* | 3/2012 | Brinks et al. | 713/310 |

* cited by examiner

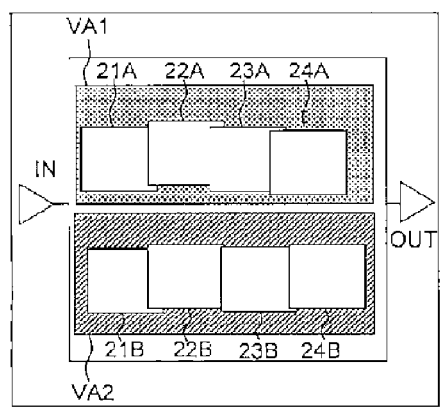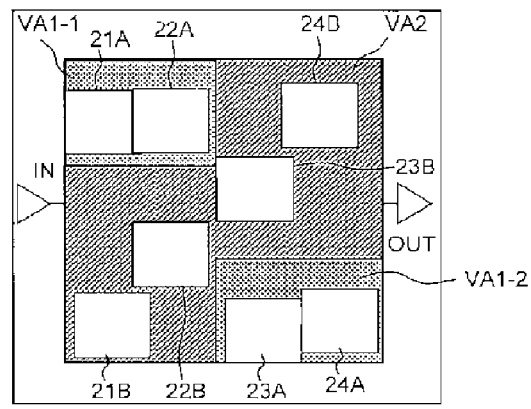
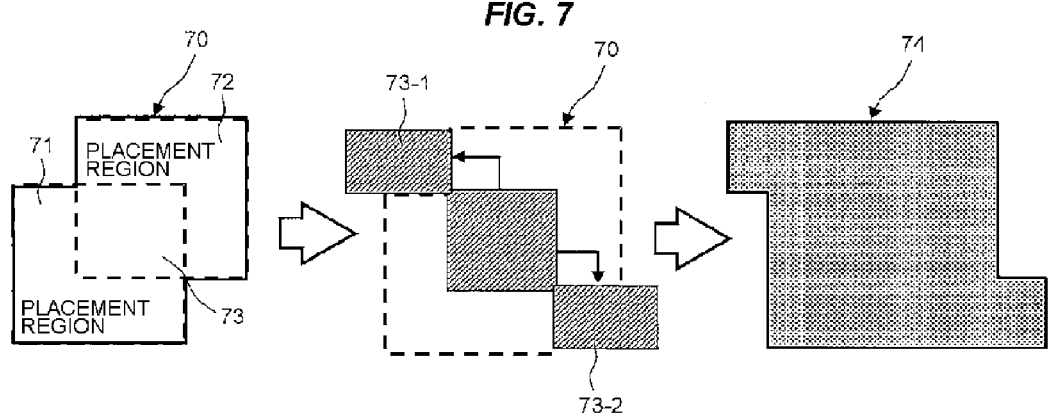
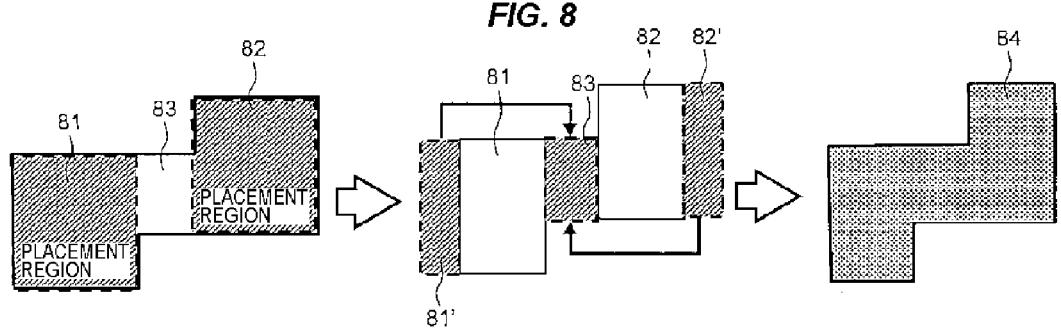

FIG. 10A
○ SIMULTANEOUS OPERATION BLOCK A
◯ SIMULTANEOUS OPERATION BLOCK B
FIG. 10B
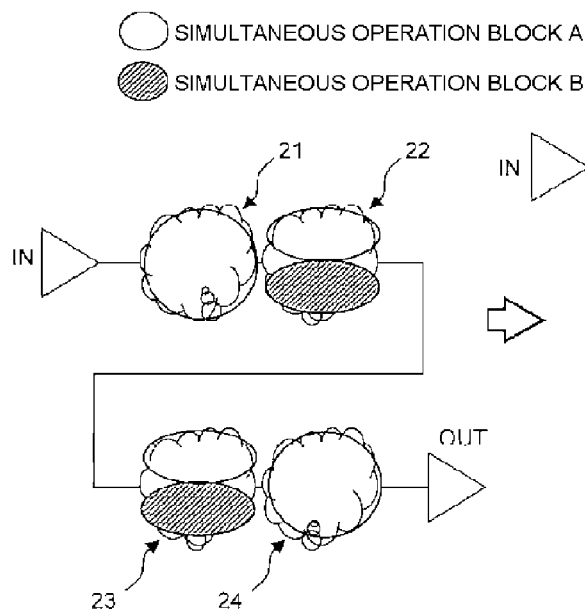
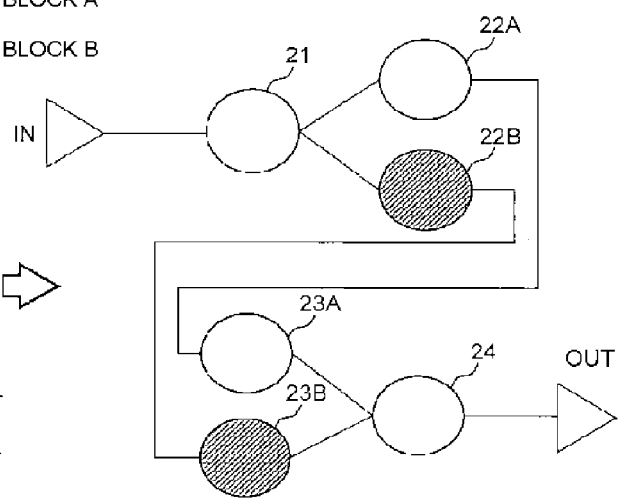

OBTAINING POWER DOMAIN BY CLUSTERING LOGICAL BLOCKS BASED ON ACTIVATION TIMINGS

CROSS-REFERENCE TO RELATED APPLICATION

The disclosure of Japanese Patent Application No. 2011-32775 filed on Feb. 18, 2011 including the specification, drawings and abstract is incorporated herein by reference in its entirety.

BACKGROUND

The present invention relates to a layout technique of semiconductor integrated circuits, and particularly to a technique which is effective when applied to the circuit design of portable devices such as a cellular phone and a Personal Digital Assistant (PDA).

In the circuit design of portable devices such as a cellular phone and a PDA for which demand is increasing recently, reduction of power consumption has become essential. The technique of dividing a logical block on a chip into several groups and performing ON/OFF control of power source for each group is effective in reducing power consumption. A group of logical blocks operating at a single power source voltage level is referred to as the "power domain", and a physical placement area of the logical block operating at the single power source voltage level is referred to as the "voltage island".

Japanese Patent Laid-Open No. 2008-176486 (Patent document 1) describes a method of generating a voltage island at an operation synthesis level or a function design level such as Register Transfer Level (RTL). According to Patent document 1, area, timing and power consumption are estimated at the function design level and the voltage island is generated based on the estimated value. In improving timing violation or reducing area at the function design level, improvement is attempted by assigning a higher value to the power source voltage value. In addition, in reducing power consumption, improvement is attempted by assigning a smaller value to the power source voltage. A voltage island is generated, and the influence by the provision of the voltage island is fed back to the operation synthesis process. Accordingly, a circuit which has been optimized in terms of timing, area, and power consumption can be obtained in a short period.

SUMMARY

The multi power source design approach, which optimizes power consumption of the circuit, can be mentioned as an approach of power consumption design for a semiconductor integrated circuit. The multi power source design approach uses the power-off technique, multi power source technique, and Dynamic Voltage Frequency Scaling (DVFS: substrate bias control) technique. According to the power-off technique, the power source of an unused logical block (simply referred to as "block") is temporarily turned off to reduce leakage current. Although a circuit which performs ON/OFF control of the power source is required in the power-off technique and it is necessary to insert a level shifter between the wirings connecting blocks having low power source voltages to blocks having high power source voltages in the multi power source technique, which may lead to an overhead in the circuit, they exhibit a very large effect of reducing power consumption owing to the ability of supplying an optimal power source voltage to individual blocks in operation. According to the multi power source technique, a plurality of power source voltages with different voltage levels is generated and the optimal power source voltage is assigned to individual blocks. According to the DVFS technique, the power source voltage and operating frequency are lowered when the load to be processed is light, and then power consumption is reduced.

However, the technique of supplying the optimal power source voltage to individual blocks in operation is not automated although the technique related to power-off, multi power source, and DVFS technique are used, and thus the conventional multi power source design method must rely on manpower (manual labor of the designer). Optimizing the power domain may be inadequate, depending on the designer's skill.

Patent document 1 describes a proposal about multi power source, without taking into consideration power-off and DFVS. In addition, patent document 1 describes no automating generation of a power domain which is a logic level of a voltage island. Furthermore, patent document 1 describes no generation of a power domain considering the physical placement of a block either.

The present invention has been made in view of the above circumstances and provides a technique to automatically generate a power domain.

The other purposes and the new feature of the present invention will become clear from the description of the present specification and the accompanying drawings.

The following explains briefly the outline of a typical invention among the inventions disclosed in the present application.

A computer performs a function simulation process for evaluating whether or not a designed circuit satisfies a specification, and a clustering process which obtains a power domain by clustering logical blocks in which activation timings are within a range, based on the result of the function simulation process.

The following explains briefly the effect acquired by the typical invention among the inventions disclosed in the present application.

A technique for automatically generating a power domain can be obtained.

BRIEF DESCRIPTION OF THE DRAWINGS

FIG. 6 is a diagram of a grouping process in the voltage island generating process in FIG. 1.

FIG. 7 is a diagram of voltage island generation in the voltage island generating process in FIG. 1.

FIG. 8 is a diagram of voltage island generation in the voltage island generating process in FIG. 1.

FIG. 10 is a diagram of a clustering process in the voltage island generating process in FIG. 1.

DETAILED DESCRIPTION

1. Outline of Embodiments

Figure 1:
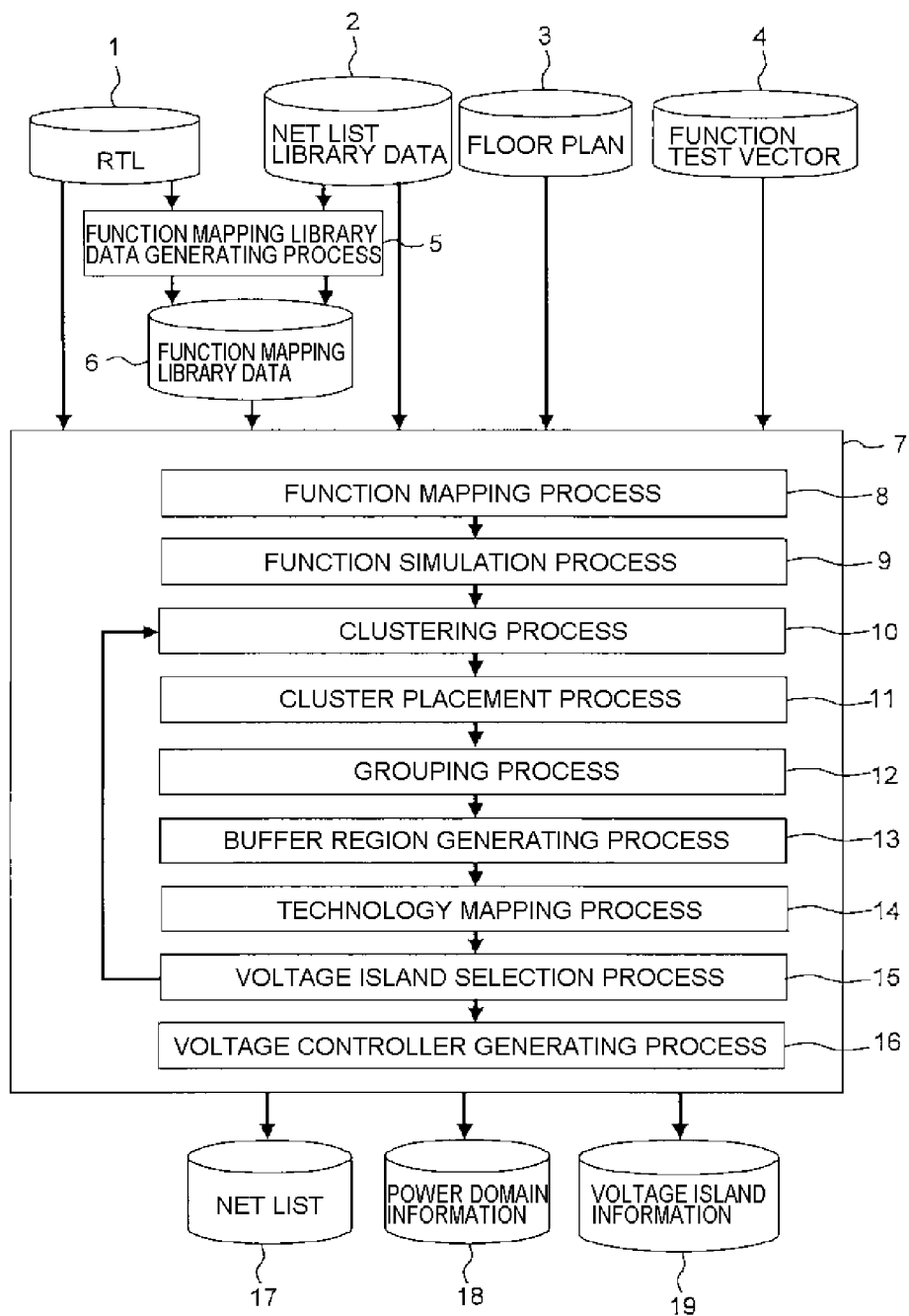
FIG. 1 is a diagram of a voltage island generating process as a layout method of a semiconductor integrated circuit in accordance with the present invention.

First, representative embodiments of the invention disclosed in this application will be explained in outline. The reference numerals in the drawings which are referred to with parentheses in the outline explanation with regard to the representative embodiments only illustrate elements included in the concept of the components to which the numerals are obtained.

[1] In a layout method of a semiconductor integrated circuit in accordance with representative embodiments of the present invention, a computer performs a function simulation process (9) for evaluating whether or not a designed circuit satisfies a specification, and a clustering process (10) which obtains a power domain by clustering respective logical blocks in which activation timings are within a range, based on the result of the function simulation process. Since the power domain is obtained by a process performed by a computer, the power domain can be optimized compared to when obtained by hand (manual work of the designer).

[2] In the article [1], the computer performs a grouping process (12) for generating a voltage island corresponding to the power domain.

[3] In the article [2], the computer performs determination (15) of whether or not a processing result including an optimal voltage island has been obtained using, as an index, the estimation result of the area, operation timing, a wiring congestion, and power consumption of the circuit and, depending on the determination result, returns to the clustering process to redo generation of the power domain with a modified condition.

[4] In the article [3], information of the power domain is stored in a storage device (33) through control by the computer.

[5] In the article [4], the computer performs a grouping process (12) for reading the information of the power domain stored in the storage device to generate a voltage island corresponding to the power domain.

[6] In the article [3], a place and route validation process is included which reads voltage island information from the storage device (33) and determines whether or not the place and route of the voltage island information is valid. In the place and route validation process, the computer performs a process (13) of generating, at an interval, a buffer region in which buffers can be placed, if a position where a timing condition cannot be satisfied exists.

[7] In another layout method of a semiconductor integrated circuit in accordance with a representative embodiment of the present invention, a computer performs a function simulation process (9) for evaluating whether or not a designed circuit satisfies a specification, and a clustering process (10) which obtains a power domain by clustering respective logical blocks in which activation timings are within a range, based on the result of the function simulation process. Furthermore, the computer performs a process of reading a net list of a designed circuit from the storage device and a voltage island selection process (15) which estimates the area, operation timing, a wiring congestion, and power consumption of the circuit, based on the net list of the circuit, and provides a voltage island corresponding to the power domain using the estimation result as an index. Since the power domain is obtained by a process performed by a computer, the power domain can be optimized compared to when obtained by hand (manual work of the designer).

[8] A program in accordance with a representative embodiment of the present invention causes a computer to execute a function simulation process (9) for evaluating whether or not a designed circuit satisfies a specification, and a clustering process (10) which obtains a power domain by clustering respective logical blocks in which activation timings are within a range, based on the result of the function simulation process.

[9] Another program in accordance with a representative embodiment of the present invention causes a computer to execute a function simulation process (9) for evaluating whether or not a designed circuit satisfies a specification, and a clustering process (10) which obtains a power domain by clustering respective logical blocks in which activation timings are within a range, based on the result of the function simulation process. Furthermore, the program causes the computer to execute a process of reading a net list of a designed circuit from the storage device and a voltage island selection process (15) which estimates the area, operation timing, a wiring congestion, and power consumption of the circuit, based on the net list of the circuit, and provides a voltage island corresponding to the power domain using the estimation result as an index. Since the power domain is obtained by a process performed by a computer, the power domain can be optimized compared to when obtained by hand (manual work of the designer).

2. Details of Embodiments

The embodiments will be explained in detail below.

Embodiment 1

Figure 3:
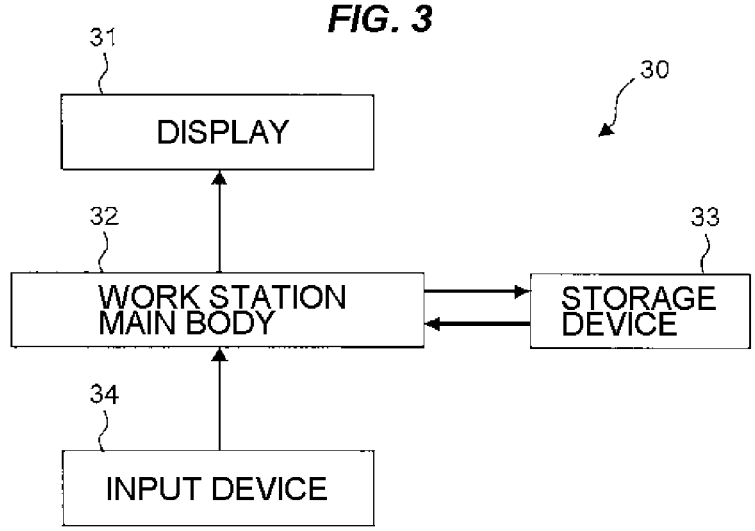
FIG. 3 is a block diagram of a configuration of a work station for which the layout method of a semiconductor integrated circuit in accordance with the present invention is implemented.

FIG. 3 shows a work station used to implement the semiconductor integrated circuit layout method in accordance with the present invention. A work station 30 in FIG. 3 includes, although not particularly limited to the following, a display 31, a work station main body 32, a storage device 33, and an input device 34. The work station main body 32 has a Central Processing Unit (CPU) for executing programs, and is a computer in the present invention. The storage device 33 is an HDD, storing programs executed on the work station main body 32, and various information used for layout of semiconductor integrated circuits mounted on portable devices such as cellular phones and PDAs. The input device 34 is a keyboard or a mouse, which can input various information to the work station main body 32 by operation of the designer of the semiconductor integrated circuit. The display 31 visualizes display data supplied from the work station main body 32.

FIG. 1 is a flow chart of the voltage island generating process using the work station 30.

The voltage island generating process 7 is performed by the work station main body 32. Before the voltage island generating process 7, a program for performing a function mapping library data generating process 5 is read in the work station main body 32 and function mapping library data 6 is generated by executing the program. The function mapping library data is generated, based on RTL1 and net list library data 2. The RTL1 uses a technique of describing a synchronous digital circuit to configure the circuit operation by combining the signal flow between registers and the logical operation corresponding to the signal flow, and the net list library data 2 is library data for generating a net list. The RTL1 and net list library data 2 are stored in the storage device 33 in advance. The information of area, operation timing, and power consumption of each operation device, such as area, operation timing, and power consumption of the adder, or those of the multiplier are set in the function mapping library data 6. According to such function mapping library data 6, area, operation timing, and power consumption of the circuit can be estimated with regard to the result of function mapping. The generated function mapping library data 6 is stored in the storage device 33.

Next, a program for causing the work station main body 32 to perform the voltage island generating process 7 is read. The program is executed on the work station main body 32 to perform the voltage island generating process 7. In the voltage island generating process 7, the RTL1, the net list library data 2, a floor plan 3, a function test vector 4, and the function mapping library data 6 are referred to generate a net list 17, power domain information 18, and voltage island information 19.

The floor plan 3 includes placement information of a die area and an input/output (IO) circuit, but includes neither hard macro placement nor voltage island information. The function test vector 4, being a sequence of logical values "0" and "1", is function simulation data for evaluating whether or not a designed circuit satisfies a specification. The floor plan 3 and the function test vector 4 are stored in the storage device 33 in advance.

The voltage island generating process 7 includes a function mapping process 8, a function simulation process 9, a clustering process 10, a cluster placement process 11, a grouping process 12, a buffer region generating process 13, a technology mapping process 14, a voltage island selection process 15, and a voltage controller generating process 16. When the program for performing the voltage island generating process 7 is executed on the work station main body 32, the function mapping process 8, the function simulation process 9, the clustering process 10, the cluster placement process 11, the grouping process 12, the buffer region generating process 13, the technology mapping process 14, the voltage island selection process 15, and the voltage controller generating process 16 are performed.

Each of the processes in the voltage island generating process 7 will be explained next.

In the function mapping process 8, the RTL1 for which a voltage island is generated is read from the storage device 33, and operation devices such as the adder and the multiplier are assigned in accordance with the description of the RTL1.

After the function mapping process 8 is completed, the function simulation process 9 for evaluating whether or not a designed circuit satisfies a specification is performed. In the function simulation process 9, the function test vector 4 which is the data for function simulation is read and function simulation is performed.

Figure 4A:
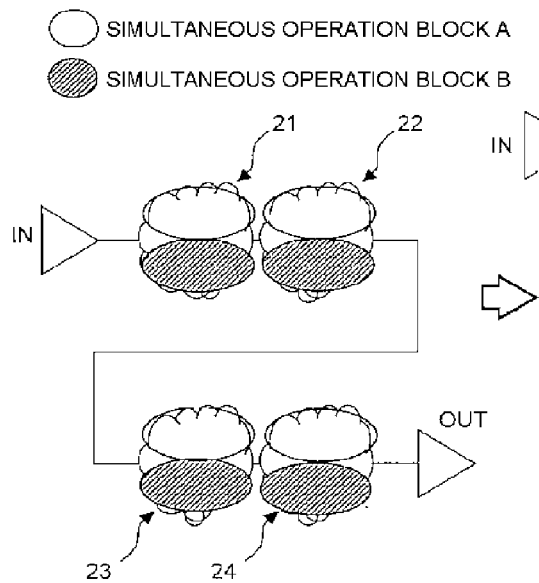
FIG. 4 is a diagram of a clustering process in the voltage island generating process in FIG. 1.
Figure 4B:
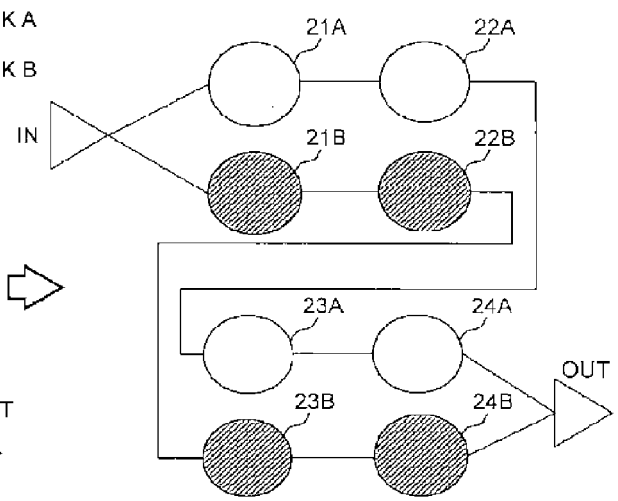

In the clustering process 10, clustering is performed for each simultaneous operation, based on the simulation result in the function simulation process 9. A "simultaneous operation block" refers to a block in which the activated timing is approximately simultaneous. Whether or not the activated timing is approximately simultaneous is determined according to a threshold specified by the designer. If the threshold has been set to 70% by the designer, blocks whose timing of activation matches with a rate of 70 percent or more are defined as simultaneous operation blocks. As shown in (A) in FIG. 4, in the clustering process 10 having a 32-bit adder 21, 32-bit multipliers 22 and 23, and a 32-bit adder 24 between an input buffer (IN) and an output buffer (OUT), clustering is performed as shown in (B) in FIG. 4, based on the simulation result in the function simulation process 9. The 32-bit adder 21 is divided into a block 21A which performs addition of the upper 16 bits and a block 21B which performs addition of the lower 16 bits. The 32-bit multiplier 22 is divided into a block 22A which performs multiplication of the upper 16 bits and a block 22B which performs multiplication of the lower 16 bits. In addition, the 32-bit multiplier 23 is divided into a block 23A which performs multiplication of the upper 16 bits and a block 23B which performs multiplication of the lower 16 bits, and the 32-bit adder 24 is divided into a block 24A which performs addition of the upper 16 bits and a block 24B which performs addition of the lower 16 bits. The blocks 21A, 22A, 23A, and 24A are defined as a simultaneous operation block A whose activation time matches at a rate of 70 percent or more. The blocks 21B, 22B, 23B, and 24B are defined as a simultaneous operation block B whose activation time matches at a rate of 70 percent or more. The simultaneous operation block A and the simultaneous operation block B are defined as a "power domain" which is a group of logical blocks respectively operating at a single power source voltage level.

After the clustering process has been performed in the clustering process 10, the cluster placement process 11 is performed. In the cluster placement process 11, the blocks divided in the clustering process 10 are placed on the floor plan 3. Simultaneous operation blocks of the same type are placed as close as possible to each other. In other words, the blocks 21A, 22A, 23A, and 24A belonging to the simultaneous operation block A are placed close to each other. The blocks 21B, 22B, 23B, and 24B belonging to the simultaneous operation block B are placed close to each other. An algorithm generally used in the placement process of semiconductor integrated circuit can be applied to the cluster placement process.

Figure 5A:
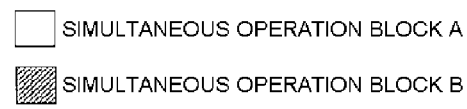
FIG. 5 is a diagram of a cluster placement process in the voltage island generating process in FIG. 1.
Figure 5B:
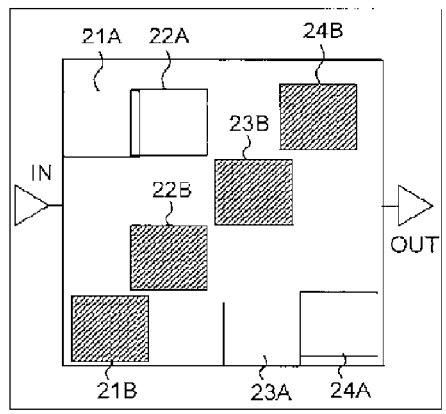

In the cluster placement process 11, area, operation timing, and power consumption of the circuit are estimated with regard to the function mapping result, by referring to the function mapping library data 6. Weighting is then performed to area, operation timing, and power consumption of the circuit, and cluster placement is performed every time the weighting coefficient is changed so that a plurality of cluster placement results is obtained. A cluster placement result putting emphasis on area of the circuit is obtained by increasing the weighting coefficient for the area of the circuit, a cluster placement result putting emphasis on operation timing is obtained by increasing the weighting coefficient for the operation timing, and a cluster placement result putting emphasis on power consumption is obtained by increasing the weighting coefficient for the power consumption. The plural cluster placement results are obtained by changing the weighting coefficient for area, operation timing, and power consumption of the circuit to allow selection of an optimal voltage island in the subsequent voltage island selection process 15. FIG. 5 shows a cluster placement. In the placement in (A) in FIG. 5, the simultaneous operation block A (21A, 22A, 23A, and 24A) and the simultaneous operation block B (22A, 22B, 23B, and 24B) are placed in the same direction (in a direction marked with an arrow X). In the placement in (B) in FIG. 5, the simultaneous operation block A is divided into 21A, 22A and 23A, 24A for placement and the simultaneous operation block B (22A, 22B, 23B, and 24B) is placed between the simultaneous operation block A. The simultaneous operation block B (21A, 22B, 23B, and 24B) is placed in a direction across the arrow X.

After the cluster placement process 11, the grouping process 12 is performed on a placement region of simultaneous operation block. In the grouping process 12, a "voltage island" is generated as a physical placement area of a logical block which operates at a single power source voltage level by grouping corresponding placement regions if the interval between placement regions of simultaneous operation blocks of the same type is smaller than a reference value specified by the designer. FIG. 6 shows a grouping of placement regions. In the grouping of (A) in FIG. 6, placement regions of the simultaneous operation block A (21A, 22A, 23A and 24A) is grouped to generate a voltage island VA1 corresponding to the first power domain, and those of the simultaneous operation block B (22A, 22B, 23B and 24B) are grouped to generate a voltage island VA2 corresponding to the second power domain. In the grouping in (B) in FIG. 6, two voltage islands corresponding to the first power domain are generated. Placement regions of the simultaneous operation block A (21A, 22A) are grouped to generate a voltage island VA1-1 corresponding to the first power domain, and those of the simultaneous operation block A (23A, 24A) are grouped to generate a voltage island VA1-2 corresponding to the first power domain. This is because intervals between the blocks 21A and 22A, and between the blocks 23A and 24A exceed a reference value determined by the designer. In addition, placement regions of the simultaneous operation block B (22A, 22B, 23B and 24B) are grouped to generate a voltage island VA2 corresponding to the second power domain. The first power domain and the second power domain are grouped as logical blocks operating at a single power source voltage level, the information of which is stored in the storage device 33 as the power domain information 18.

In grouping placement regions of a simultaneous operation block, two cases can be considered: placement regions with overlapping and those without overlapping. Quadrangular placement regions 71 and 72 are grouped as shown in FIG. 7. If an overlapping 73 is between the placement regions 71 and 72, compensation regions 73-1 and 73-2 equivalent to the area of the overlapping 73 are added to the grouping region 70. The total area of the compensation regions 73-1 and 73-2 is equal to the area of the overlapping 73. A voltage island 74 is then generated with the compensation regions 73-1 and 73-2 added to the grouping region 70 of the placement region 71 and the placement region 72. Since such formation of the voltage island 74 with the compensation regions 73-1 and 73-2 equivalent to the area of the overlapping 73 added to the grouping region 70 optimizes the voltage island 74, the inconvenience of failure to accommodate cells in the voltage island can be avoided in the place and route/circuit optimization process described below. In addition, as shown in FIG. 8, since quadrangular placement regions 81 and 82 are placed at an interval, grouping may be performed in a manner surrounding the placement regions 81 and 82 so that gap 83 is generated between the placement regions 81 and 82. A partial region 81' of the placement region 81 and a partial region 82' of the placement region 82 are determined so that the total area of the partial regions 81' and 82' becomes equal to the area of the gap 83, and a voltage island 84 is generated after the area is compensated to fill the gap 83 using the partial regions 81' and 82'. Since such formation of the voltage island 84 after the area is compensated in a manner filling the gap 83 using the partial regions 81' and 82' optimizes the voltage island 84, occurrence of a surplus cell placement region (cell unplaced area) can be avoided in the voltage island 84 in place and route/circuit optimization process described below.

In the grouping process 12, a plurality of results of grouping is obtained, corresponding to the cluster placement results obtained in the cluster placement process 11.

The buffer region generating process 13 will be explained.

Figure 9:
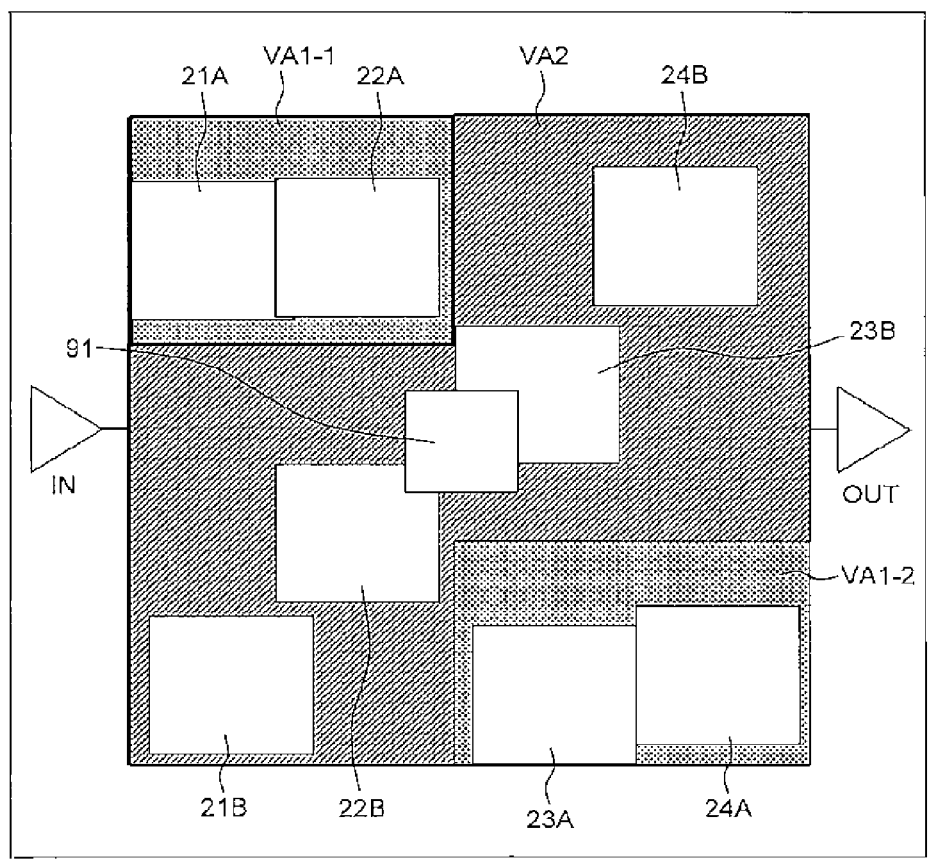
FIG. 9 is a diagram of a buffer region generating process in the voltage island generating process in FIG. 1.

In the buffer region generating process 13, a voltage island belonging to another power domain is first generated between voltage islands belonging to the same power domain, and it is determined whether or not a position where a timing condition cannot be satisfied exists because of the voltage islands. The determination is performed to a plurality of results of grouping in the grouping process 12. If it is determined that a position where the timing condition cannot be satisfied exists, a buffer region is generated in which buffers can be placed at an interval. The buffer region is a region to place buffers which are inserted to satisfy the timing condition between cells. The buffer region is generated at a position where the wiring is as less congested as possible. FIG. 9 shows a buffer region placement. As shown in FIG. 9, a voltage island VA2 corresponding to the second power domain exists between the voltage islands VA1-1 and VA1-2 corresponding to the first power domain. If the timing condition cannot be satisfied due to a signal delay in a path transmitting the output of the block 22A to the block 23A, a buffer region 91 is generated in the voltage island VA2. The inter-cell timing condition can be satisfied by transmitting the output of the block 22A to the block 23A via a buffer generated in the buffer region 91.

The technology mapping process 14 will be explained.

In the technology mapping process 14, technology mapping is performed, based on the voltage island generated by the grouping process 12 and the processing result in the function mapping process 8. The technology mapping causes the operation devices such as the adder and the multiplier to be replaced by gate levels such as AND or OR. The net list 17 is also generated in the technology mapping process 14. In the technology mapping process 14, a plurality of results technology mapping is obtained corresponding to the results of grouping by the grouping process 12.

The voltage island selection process 15 will be explained.

Figure 11:
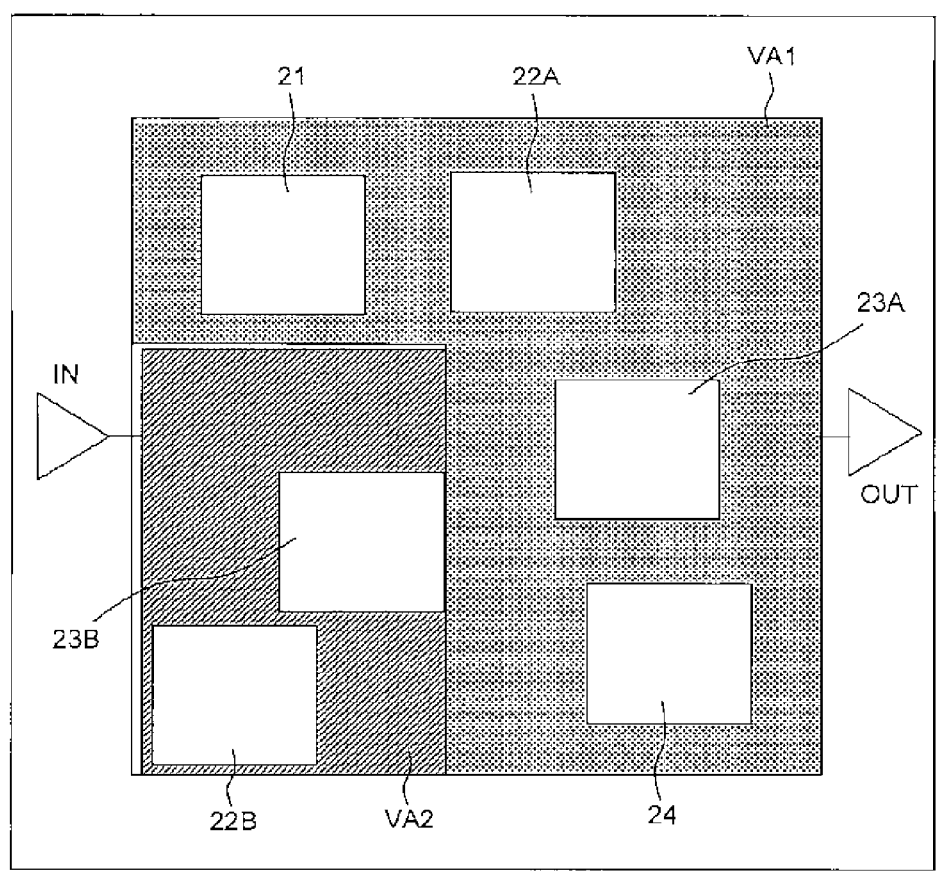
FIG. 11 is a diagram of a grouping process in the voltage island generating process in FIG. 1.

In the voltage island selection process 15, area, operation timing, wiring congestion, and power consumption of the circuit are estimated with regard to the results of technology mapping. It is then determined whether or not there exits a processing result including an optimal voltage island exists among the results of technology mapping by the technology mapping process 14 using the estimation result as an index. If the area, operation timing, wiring congestion, and power consumption of the circuit satisfy a constraint, it is determined that a processing result including an optimal voltage island exists, and the corresponding voltage island information 19 is obtained. The voltage island information 19 is stored in the storage device 33. If it is determined that all the results of technology mapping by the technology mapping process 14 indicate that area, operation timing, wiring congestion, and power consumption of the circuit do not satisfy the constraint, no processing result including an optimal voltage island exists. In the case, the process returns to the clustering process 10, where the threshold used for determining whether activation timings are approximately simultaneous is changed and clustering is performed according to the changed threshold. If the current threshold has been set to 70%, it is changed to 80% and clustering is performed again. FIG. 10 shows a clustering in this case. In the second clustering process 10 in which the 32-bit adder 21, the 32-bit multipliers 22 and 23, and the 32-bit adder 24 are between the input buffer (IN) and the output buffers (OUT) as shown in (A) in FIG. 10, clustering is performed as shown in (B) in FIG. 10, based on the simulation result in the function simulation process 9. The 32-bit multiplier 22 is clustered into the block 22A which performs multiplication of the upper 16 bits and the block 22B which performs multiplication of the lower 16 bits, the 32-bit multiplier 23 is clustered into the block 23A which performs multiplication of the upper 16 bits and the block 23B which performs multiplication of the lower 16 bits. However, clustering is not performed for the 32-bit adder 21 and the 32-bit adder 24 because the threshold value is changed to 80%. Then, based on the processing result in the clustering process 10, the cluster placement process 11, the grouping process 12, the buffer region generating process 13, the technology mapping process 14, and the voltage island selection process 15 are performed again. These processes are repeated until the voltage island information 19 including the optimal voltage island is obtained. FIG. 11 shows a grouping of a placement region in which the clustering in FIG. 10 is placed. In the grouping in FIG. 11, the placement regions of the simultaneous operation block A (21, 22A, 23A, and 24) are grouped to generate the voltage island VA1, and those of the simultaneous operation block B (22B and 23B) is grouped to generate the voltage island VA2.

The voltage controller generating process 16 will be explained next.

As described above, the voltage controller generating process 16 is performed after the voltage island information 19 including an optimal voltage island is obtained by the voltage island selection process 15. In the voltage controller generating process 16, a voltage controller for performing ON/OFF control of the power source for each simultaneous operation block is generated by referring to the power domain information 18 and the voltage island information 19.

Figure 2:
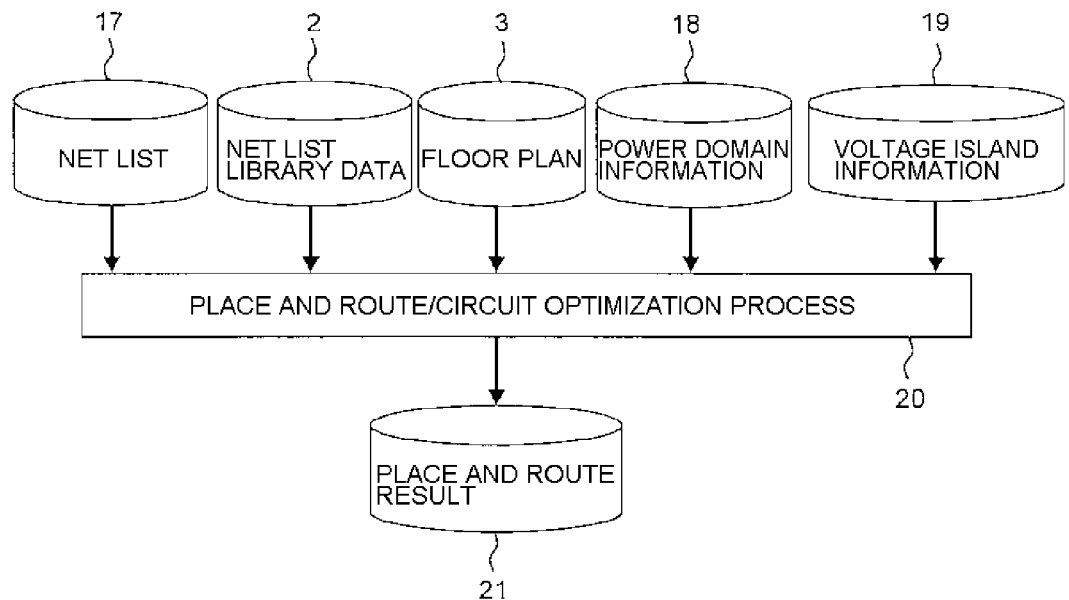
FIG. 2 is a diagram of a place and route/circuit optimization process using the result of the voltage island generating process in FIG. 1.

After the net list 17, the power domain information 18, and the voltage island information 19 are generated by the voltage island generating process 7, a program for the place and route/circuit optimization process 20 in FIG. 2 is read into and executed on the work station main body 32 so that cells are placed in the voltage island and wiring between the cells is performed. Then, place and route information 21 of the semiconductor integrated circuit can be obtained. In the place and route/circuit optimization process 20, the net list 17, the net list library data 2, the floor plan 3, the power domain information 18, and the voltage island information 19 of the semiconductor integrated circuit are referred. At that time, the net list 17, the power domain information 18, and the voltage island information 19 obtained in the voltage island generating process 7 are used. An algorithm generally used can be applied to the place and route/circuit optimization process 20.

The following effects can be acquired in accordance with Embodiment 1.

(1) Since the clustering process 10 is performed, based on the simulation result in the function simulation process 9, a simultaneous operation block which is a power domain can be easily required. Since the simultaneous operation block can be automatically provided by executing a program on the work station main body 32, the power domain can be optimized compared to when obtained by hand (manual work of the designer).

(2) In the voltage island selection process 15, it is determined whether or not a processing result including an optimal voltage island exists among the results of technology mapping by the technology mapping process 14 using, as an index, the estimation result of the area, operation timing, wiring congestion, and power consumption of the circuit obtained in the technology mapping process 14. If it is determined that no processing result including an optimal voltage island exists, the process returns to the clustering process 10. Then, the threshold used for determining whether activation timings are approximately simultaneous is changed and clustering is performed according to the changed threshold and the power domain is generated again, and then the power domain considering physical placement of blocks can be generated.

Embodiment 2

When the power domain information 18 has already been obtained by the voltage island generating process 7 in FIG. 1 and stored in the storage device 33, it may be desired to read the power domain information 18 into the work station main body 32 and newly generate the voltage island information 19.

The voltage island generating process 7 in such a case is performed as follows.

Figure 12:
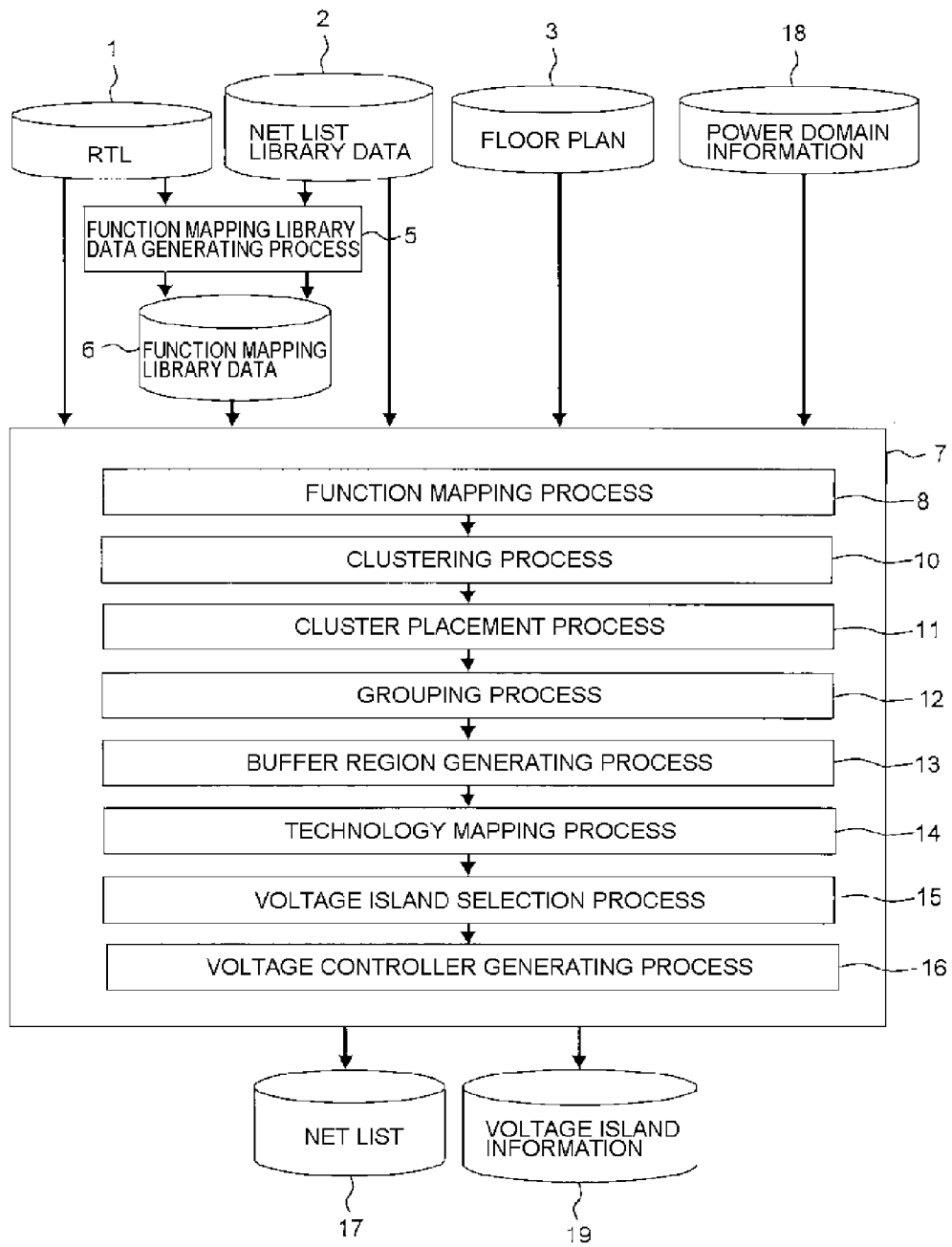
FIG. 12 is another diagram of a voltage island generating process as a layout method of a semiconductor integrated circuit in accordance with the present invention.
Figure 13A:
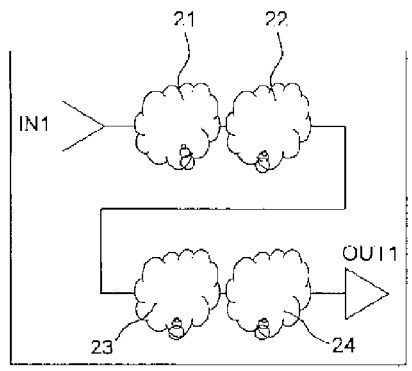
FIG. 13 is a diagram of a clustering process in the voltage island generating process in FIG. 12.
Figure 13B:
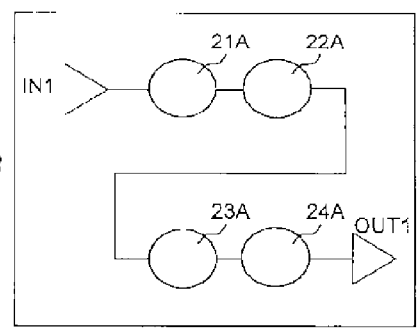
Figure 13C:
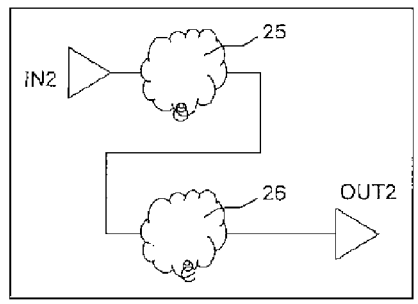
Figure 13D:
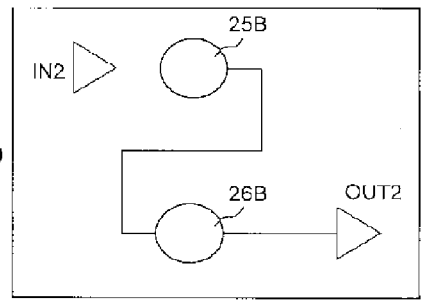

FIG. 12 is a flow chart of the voltage island generating process in generating the voltage island information 19 corresponding to the existing power domain information 18.

The voltage island generating process 7 in FIG. 12 largely differs from that in FIG. 1 in that the function simulation process 9 is omitted. This is because the power domain information has already been obtained and thus the function simulation process 9 to newly acquire the power domain information 18 becomes unnecessary. Therefore, the clustering process 10 is performed after the function mapping process 8. FIG. 13 shows a clustering process in a case where power domains A and B are provided by the power domain information 18. Clustering is performed for each operation device as shown in (B) in FIG. 13 in the clustering process 10 in a case where the 32-bit adder 21, the 32-bit multipliers 22 and 23, and the 32-bit adder 24 are between the input buffer (IN) and the output buffer (OUT) as shown in (A) in FIG. 13. They are clustered into the block 21A which performs a 32-bit addition process, the block 22A which performs a 32-bit multiplication process, the block 23A which performs a 32-bit addition process, and the block 24A which performs a 32 bit multiplication process. Additionally, in the clustering process 10 a 32-bit adder 25 and a 32-bit multiplier 26 are between the input buffer (IN) and the output buffer (OUT) as shown in (C) in FIG. 13, clustering is performed for each operation device as shown in (D) in FIG. 13. They are clustered into the block 25B which performs a 32-bit addition process and the block 26B which performs a 32-bit multiplication process.

In addition, the voltage island generating process 7 in FIG. 12 slightly differs from that in FIG. 1 as described below.

Although the cluster placement process 11 in FIG. 12 is similar to that in FIG. 1, clusters belonging to the same power domain are placed close to each other in the cluster placement process 11 in FIG. 12.

In the grouping process 12 shown in FIG. 12, clusters belonging to the same power domain are grouped.

In the voltage island selection process 15 in FIG. 12, the process never returns to the clustering process 10. This is because the power domain information 18 has already been provided and it is assumed to be unchanged.

In accordance with Embodiment 2, the voltage island information 19 corresponding to the existing power domain information 18 can be generated in the voltage island generating process 7 in FIG. 12.

Embodiment 3

Figure 14:
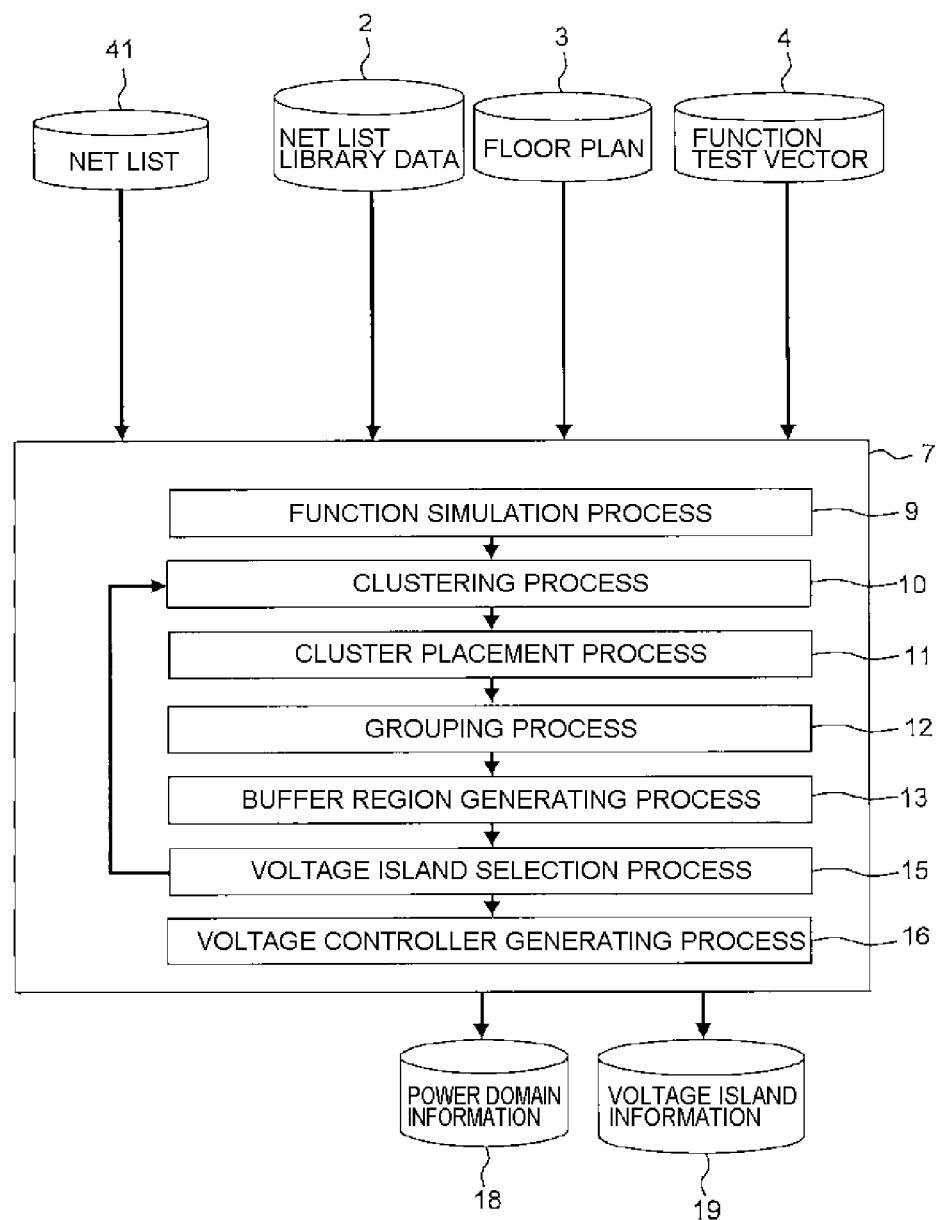
FIG. 14 is another diagram of a voltage island generating process as a layout method of a semiconductor integrated circuit in accordance with the present invention.

The net list may be taken instead of the RTL1 in FIG. 1. FIG. 14 is a flow chart of the voltage island generating process in such a case.

The voltage island generating process 7 in FIG. 14 largely differs from that in FIG. 1 in that a net list 41 is referred to instead of the RTL1. In addition, the function mapping library data generating process 5, the function mapping process 6, and the technology mapping process 14 in FIG. 1 are omitted in FIG. 14. This is because the function mapping library data generating process 5, the function mapping process 6, and the technology mapping process 14 are unnecessary since the net list 41 of the circuit has been provided.

The function simulation process 9, the clustering process 10, the cluster placement process 11, the grouping process 12, and the buffer region generating process 13 in FIG. 14 are supposed to be similar to those in FIG. 1. In the cluster placement process 11, however, area, operation timing, and power consumption of the circuit are estimated, based on the net list 41. In the voltage island processing 15, area, operation timing, a wiring congestion, and power consumption of the circuit are estimated, based on the net list 41. It is then determined whether there is a processing result including an optimal voltage island using the estimation result as an index, and the voltage island information 19 is obtained, based on the determination result.

As described, the power domain information and the voltage island information can be obtained by referring to the net list instead of the RTL1 in FIG. 1.

Embodiment 4

Figure 15:
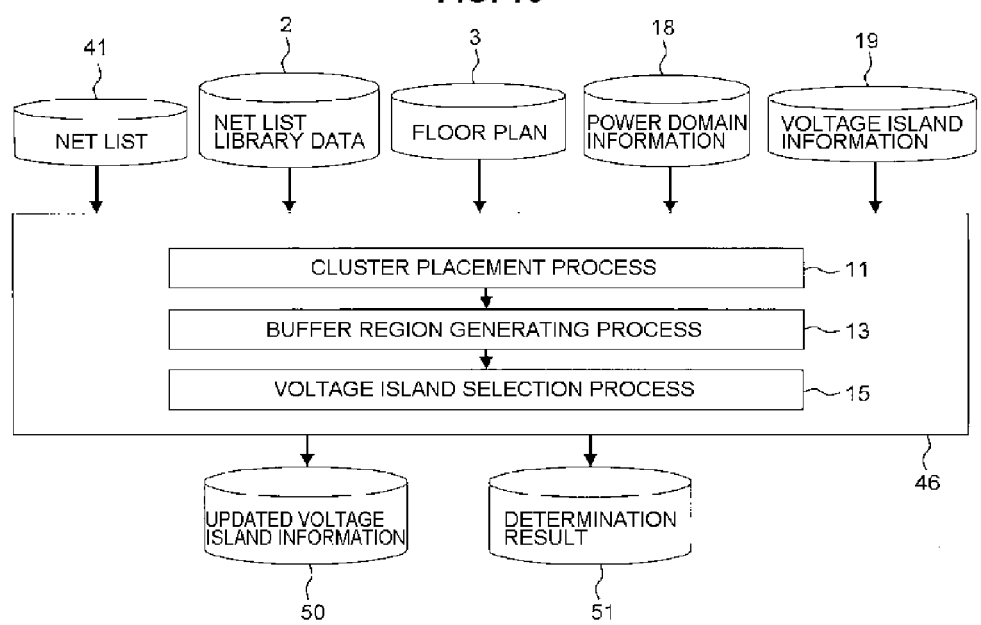
FIG. 15 is a diagram of a place and route validation process using the work station in FIG. 3.

It is possible to grasp the validity of the place and route of the already generated voltage island by using a part of the process in the voltage island generating process 7 in FIG. 1. FIG. 15 is a flow chart of the process in this case. In a place and route validation process 46 in FIG. 15, the net list 41, the net list library data 2, the floor plan 2, the power domain information 18, the voltage island information 19 are read from the storage device 33 into the work station main body 32. The place and route validation process 46 includes the cluster placement process 11, the buffer region generating process 13, and the voltage island selection process 15. The contents of the cluster placement process 11, the buffer region generating process 13, and the voltage island selection process 15 are basically equal to the corresponding processes in FIG. 1. The place and route validation process 46 is performed as follows.

First, voltage island information 45 is read from the storage device 33 into the work station main body 32, and cluster placement is performed by a cluster placement process 47.

If timing can be improved by adding a buffer region in the buffer region generating process 11, a buffer region is added. A buffer region is added as necessary, considering the area, power consumption, and wiring congestion.

In the voltage island selection process 15, the area, timing, power consumption, and wiring congestion are estimated, and validity of the place and route of the input voltage island is determined and output. If a buffer region has been added, the area, timing, power consumption, and wiring congestion before and after adding the buffer region are compared to determine which is optimal, and determination result 51 is obtained. If the case with an additional buffer region is optimal, the updated voltage island information 50 in FIG. 12 is obtained.

Although the invention made by the inventors has been specifically described above, based on embodiments, the invention is not limited to the embodiments and various modifications can be made in a range without deviating from its gist.

What is claimed is:

1. A layout method of a semiconductor integrated circuit using a computer, comprising a function simulation process for evaluating whether or not a designed circuit satisfies a specification, and a clustering process which obtains a power domain by clustering respective logical blocks in which activation timings are within a range, based on a result of the function simulation process, the both processes being performed by the computer.

2. The layout method of a semiconductor integrated circuit in accordance with claim 1, wherein the computer performs a grouping process for generating a voltage island corresponding to the power domain.

3. The layout method of a semiconductor integrated circuit in accordance with claim 2, wherein the computer determines whether or not a processing result including an optimal voltage island has been obtained using, as an index, the estimation result of the area, operation timing, a wiring congestion, and power consumption of the circuit and, depending on the determination result, returns to the clustering process to redo generation of the power domain with a modified condition.

4. The layout method of a semiconductor integrated circuit in accordance with claim 3, wherein information of the power domain is stored in a storage device through control by the computer.

5. The layout method of a semiconductor integrated circuit in accordance with claim 4, wherein the computer performs a grouping process for reading the information of the power domain stored in the storage device to generate a voltage island corresponding to the power domain.

6. The layout method of a semiconductor integrated circuit in accordance with claim 3 comprising a place and route validation process which reads voltage island information from the storage device and determines whether or not the place and route of the voltage island information is valid, wherein the computer performs a process of generating, at an interval, a buffer region in which buffers can be placed, if a position where a timing condition cannot be satisfied exists.

7. A program causing a computer to execute a function simulation process for evaluating whether or not a designed circuit satisfies a specification, and a clustering process which obtains a power domain by clustering logical blocks in which activation timings are within a range, based on a result of the function simulation process.

* * * * *